March 17, 1970    W. MOSKOWITZ    3,500,556

VISUAL EDUCATION DEVICE

Filed Oct. 16, 1967

INVENTOR
W. MOSKOWITZ
BY
Herbert M. Shapiro
ATTORNEY

United States Patent Office 3,500,556
Patented Mar. 17, 1970

3,500,556
VISUAL EDUCATION DEVICE
William Moskowitz, Somerville, N.J., assignor to Multi-sensory Systems, Somerville, N.J., a partnership of New Jersey
Filed Oct. 16, 1967, Ser. No. 675,377
Int. Cl. G09b *19/00*
U.S. Cl. 35—22                                10 Claims

ABSTRACT OF THE DISCLOSURE

A form board, commonly used to test the ability of a user to place blocks of prescribed shapes into mating apertures, is turned into a therapeutic tool for developing form perception and visual-motor integration by adapting the board to rotary motion. An additional spindle receiving aperture in a form board permits the operation to be realized with any common record changer.

FIELD OF THE INVENTION

This invention relates to devices for developing integration of the various human sensory systems.

BACKGROUND OF THE INVENTION

The interrelationship between the various sensory systems such as the visual and tactual senses are as subtle as they are far-reaching to an individual in his accommodation in the real world.

Most individuals have degrees of correspondence between their visual and tactual senses accepted as "normal" permitting those so endowed to operate well in the real world. This correspondence is developed from childhood through physical experiences to which each individual is subjected.

Some children develop related skills in this area more slowly than others. Unfortunately, some children mature with deficiencies in these skills; some develop almost no skills at all. Deficiencies in reading, driving, and even in relationships with other people result.

Experience is a necessary ingredient in developing intersensory integration. Toys, for example, provide tactual experiences which delight children and stimulate visual-tactual integration merely by association, manipulation and exploration. It has been shown that intersensory integration may be stimulated even further, however, by providing controlled experiences where the visual input necessitates programming of body movements.

Various devices have been found to encourage visual-tactual cooperation. For example, an apertured form board having mating geometric shapes is a common physiological testing device for observing hand-eye (visual-motor) coordination and for testing visual form perception. It is required merely to place the block of prescribed shape into the mating aperture. The eye "sees" the shape; the hand is programmed to rotate and place the block into the correspondingly shaped aperture. A simple one to one visual-tactual integration is achieved. Fine motor movement is developed by continuous use.

A rotating peg board similarly necessitates programmed arm movement to place one of like circular objects into one of a uniform array of closely spaced small circular apertures in the board. The eyes "see" apertures; the arm is programmed to follow the aperture and to insert the peg. The operation develops the central portion of the eye requiring a high degree of foveal function. It is generally understood that central vision (foveal) refers to an arc of up to approximately three degrees subtended at the fovea.

SUMMARY OF THE INVENTION

The present invention is based on the realization that the integration of the visual-tactual kinesthetic sensory modes may be developed actively by the programming of multiple physical motions responsive to visual inputs. To this end, a form board, in one illustrative embodiment, is provided in the shape of a wheel bearing a centrally located spindle receiving aperture for use with a record changer. The wheel may be rotated at one of a range of speeds for developing proficiency. Not only is finger and wrist dexterity encouraged but also arm motion is developed, importantly all under the programming of movement commands responsive to visual inputs.

The apparatus is directed at correcting deficiencies in form perception and at training the positional sense through the constant changes which are created. The apparatus trains visual-motor (occular-motor) pursuit movement employing the stimulus of a block form. Accordingly the apparatus demands multiple visual responses and trains multiple visual skills. The skills are, specifically, visual computations for positional changes, figure ground relationships, varying complexities of hand and eye coordination, and form constancy.

Deficiencies in visual-motor pursuit movement constitute a major class of deficiencies for children and is an extremely disruptive factor in their learning behavior (i.e. handwriting) patterns. Moreover, such deficiencies are present to at least some degree in an unsettlingly large portion of the population.

The apparatus is suited not only for testing (diagnosis) but also for teaching (therapy). Inasmuch as the apparatus elicits enthusiasm and interest, it is an educational toy.

DETAILED DESCRIPTION

Figure 1:
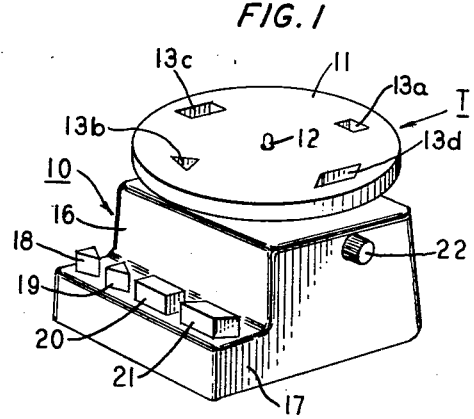
FIG. 1 is an isometric view showing a device embodying the principles of this invention.

FIG. 1 shows an illustrative turntable arrangement including a housing 10 on which a form wheel 11 is mounted The form wheel includes a spindle receiving aperture 12 centrally located for realizing rotary motion of the form wheel when turntable arrangement T is activated.

Form wheel 11 includes a plurality of positions, illustratively aperture 13a, 13b, 13c, and 13d for receiving blocks of mating shape. We shall have occasion to describe the various shapes hereinafter. Suffice it to say at this juncture that a plurality of apertures are defined in wheel 11.

Housing 10 includes a portion 17, resembling a shelf, and in turn including a plurality of apertures 18, 19, 20 and 21 for receiving mating blocks. Blocks are stored in the apertures of "shelf" 17 for use when arrangement T is activated.

Figure 2:
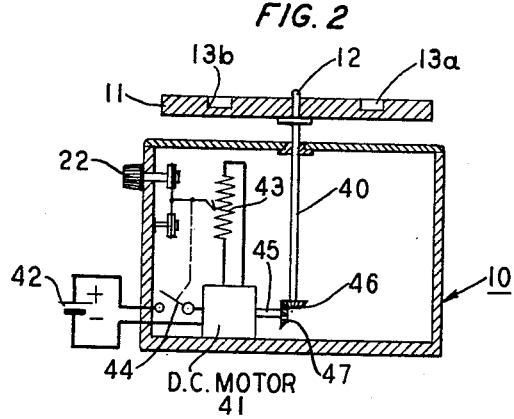
FIG. 2 is a schematic drawing of a mechanism for rotating a form wheel in accordance with this invention.

FIG. 2 shows, schematically, form wheel 11 including spindle aperture 12 adapted for receiving a spindle 40, the housing 10 includes a variable speed D.C. motor 41 powered by a source indicated by battery 42. The speed of motor 41 is controlled by variable resistor 43 the value of which is responsive to the setting of knob 22. Motor 41 is turned on and off by means of switch 44 also under the control of knob 22. Spindle 40 is coupled to the drive shaft 45 of motor 41 by a suitable gear train which typically includes first and second forty-five degree sectors 46 and 47.

A basic apparatus in accordance with this invention, then, includes means controllably turning a turntable (or form wheel) at one of a variety of speeds in a prescribed range and a turntable having a plurality of block receiving apertures. The user activates the apparatus initiating the rotation of the form wheel. A block is selected from apertures 18 through 21 and the block is introduced into the now rotating mating aperture.

Figure 3:
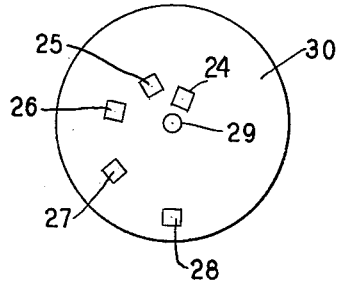
FIG. 3 is a top view of a rotatable board constructed according to the teaching of this invention for converting a common turntable into a device which encourages visual-tactual integration.

Proficiency may be improved in a variety of ways. A variety of geometric basic forms such as the triangle, rectangle, square, or any other multi-angle shape may be used. It is not expedient to change the size of the blocks or the mating apertures, so proficiency is increased by varying the number of rotations through which the form wheel is turned per minute from the slow 12 to a maximum of 18 at which some blocks may be thrown clear of the form wheel. Another technique for increasing proficiency is to change the weight of the blocks while keeping the size of the blocks constant. This is accomplished for example, by making one set of blocks of wood and another set of metal. Also, like apertures may be provided in a form wheel but at different distances from the spindle aperture. The aperture distribution accordingly follows the path of a helix. This arrangement is shown in FIG. 3 for like apertures 24, 25, 26, 27 and 28 which are consecutively greater distances from spindle aperture 29 in form wheel 30.

Rather than operating the form wheel as an apertured turntable as described above, an ordinary turntable may be adapted, in accordance with this invention, by an adapter board with apertures.

It should be understood that the embodiments described are merely illustrative of the principles of this invention. Numerous other embodiments will become obvious to one skilled in the art in light of the principles taught.

What is claimed is:

1. An adapter board comprising a planar member, means for positioning and engaging said member on the top surface of a turntable for rotation therewith, a multiangular receptacle in said member for receiving a block in a viewing position, and means for retaining a received block within said receptacle in said viewing position as said member is rotated along with the turntable.

2. An adapter board in accordance with claim 1 wherein said means for positioning and engaging comprises a spindle receiving aperture and said planar member includes a plurality of receptacles each of which is of a prescribed geometry for retaining a block of mating shape.

3. An adapter board in accordance with claim 1, including a plurality of different multiangular receptacles therein for receiving blocks of mating shape.

4. An adapter board in accordance with claim 3, wherein said multiangular receptacles comprise nonpenetrating recesses in said board.

5. An adapter board in accordance with claim 2 wherein said positions are of like geometry and spaced unequal distances from said spindle receiving aperture.

6. Apparatus in accordance with claim 2 wherein said spindle receiving aperture is centrally located in said planar member.

7. Apparatus in accordance with claim 2 wherein said plurality of receptacles are of prescribed different geometries.

8. A combination comprising a planar member, first means for defining in said planar member a plurality of positions each of which is of a prescribed multiangular geometry to receive a block of mating shape, said member having a spindle receiving aperture, and a housing, a turntable mounted on said housing, said housing including spindle means and means for rotating said turntable controllably at speeds of from about 12 to 18 r.p.m., said planar member being engageable on the top surface of said turntable for rotation therewith.

9. A combination in accordance with claim 8 wherein said housing includes a plurality of block receiving apertures for blocks of similar shape.

10. A combination in accordance with claim 9 also comprising a plurality of blocks of various shapes for mating with said apertures on a one to one basis.

References Cited

UNITED STATES PATENTS 2,416,959   3/1947   Segal.
2,747,297   5/1956   Zalkind.

EUGENE R. CAPOZIO, Primary Examiner

W. H. GRIEB, Assistant Examiner